(12) United States Patent
Darwish

(10) Patent No.: US 7,655,944 B1
(45) Date of Patent: Feb. 2, 2010

(54) SYSTEMS AND METHODS FOR ESTIMATING THERMAL RESISTANCE OF FIELD EFFECT TRANSISTOR STRUCTURES

(75) Inventor: Ali Mohamed Darwish, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 769 days.

(21) Appl. No.: 11/143,678

(22) Filed: Jun. 3, 2005

(51) Int. Cl.
*H01L 23/58* (2006.01)
(52) U.S. Cl. .................. 257/48; 257/415; 257/467; 257/E27.008
(58) Field of Classification Search .............. 257/48, 257/415, 467
See application file for complete search history.

(56) References Cited

U.S. PATENT DOCUMENTS 5,604,891 A * 2/1997 Burnett et al. ............... 703/2
6,144,085 A * 11/2000 Barker ....................... 257/467

OTHER PUBLICATIONS

Mueller, St. G. et al., "High Quality SiC Substrates for Semiconductor Devices; from Research to Industrial Production," Materials Science Forum vols. 389-393 (2002) pp. 23-28.
M. Kuball, J.M. Hayes, M.J. Uren, T. Martin, JU.C.H. Birbeck, R.S. Balmer and B.T. Hughes, "Measurement of Temperature in Active High-Power AlGaN/GaN HFETs Using Raman Spectroscopy," IEEE Electron Device Letters, vol. 23, No. 1, Jan. 2002, pp. 7-9.
M. Kuball, S. Rajasingam, A. Sarua, M.J. Uren, T. Martin, B.T. Hughes, K.P. Hilton and R.S. Balmer, "Measurement of temperature distribution in multifinger AlGaN/GaN heterostructure field-effect transistors using micro-Raman spectroscopy," Applied Physics Letters, vol. 82, No. 1, Jan. 6, 2003, pp. 124-126.
Donald B. Estreich, "A DC Technique for Determining GaAs MESFET Thermal Resistance," Fifth IEEE SEMI-THERM™ Symposium, CH2688-0/89/0000-0136, 1989 IEEE, pp. 136-139.
J.P. Landesman, E. Martin and P. Braun, "Temperature Distribution in Power GaAs Field Effect Transistors Using Spatially Resolved Photoluminescence Mapping," Proceedings of $7^{th}$ IPFA '99 Singapore, 0-7803-5187-8/99, 1999 IEEE, pp. 185-190.
John L. Wright, B.W. Marks and K.D. Decker, "Modeling of MMIC Devices for Determining MIMIC Channel Temperatures During Life Tests," Seventh IEEE SEMI-THERM™ Symposium, CH2972-8/91/ 0000-0131, 1991 IEEE, pp. 131-139.
Francesc N. Masana, "A Closed Form Solution of Junction to Substrate Thermal Resistance in Semiconductor Chips," IEEE Transaction on Components, Packaging, and Manufacturing Technology, Part A, vol. 19, No. 4, Dec. 1996, pp. 539-545.

(Continued)

*Primary Examiner*—Wai-Sing Louie
(74) *Attorney, Agent, or Firm*—Edward L. Stolarun; Lawrence E. Anderson

(57) ABSTRACT

Embodiments of systems and methods for estimating channel temperatures of a field effect transistor structure are disclosed. One method embodiment, among others, comprises receiving geometrical values corresponding to a field effect transistor (FET) structure, and associating the geometrical values of the FET structure to elliptical cylinder and prolate spheroidal coordinates to provide a closed form expression.

15 Claims, 8 Drawing Sheets

OTHER PUBLICATIONS

Richard F. David, "Computerized Thermal Analysis of Hybrid Circuits," IEEE Transactions on Parts, Hybrids, and Packaging, vol. PHP-13, No. 3, Sep. 1977, pp. 283-290.

A. Pacelli, P. Palestri, and M. Mastrapasqua, "Compact modeling of thermal resistance in bipolar transistors on bulk and SOI substrates," IEEE Trans. Electron Devices, vol. 49, No. 6, pp. 1027-1033, Jun. 2002.

Wright, B.W. Marks, and K. D. Decker, "Modeling of MMIC devices for determining MMIC channel temperatures during life tests," in 7th IEEE Semiconductor Thermal Measurement, Modeling, and Management Symp., 1991, pp. 131-139.

Y.-F. Wu, A. Saxler, M. Moore, R. P. Smith, S. Sheppard, P. M. Chavarkar, T. Wisleder, U. K. Mishra, and P. Parikh, "30-W/mm GaN HEMTs by field plate optimization," IEEE Electron Device Lett., vol. 25, pp. 117-119, Mar. 2004.

K. Boutros, M. Regan, P. Rowell, D. Gotthold, R. Birkhahn, and B. Brar, "High performance GaN HEMT's at 40 GHz with power density of 2.8 W/mm," in Proc. IEEE Int. Electron Devices Meeting, 2003, pp. 12.5.1-12.5.2.

J.W. Palmour, S. T. Sheppard, R. P. Smith, S. T. Allen, W. L. Pribble, T. J. Smith, Z. Ring, J. J. Sumakeris, A. W. Saxler, and J. W. Milligan, "Wide bandgap semiconductor devices and MMIC's for RF power applications," in Proc. IEEE Int. Electron Devices Meeting, 2001, pp. 174.1-174.4.

C. Lee, P. Saunier, J. Yang, and M. A. Khan, "AlGaN-GaN HEMT's on SiC with CW power performance of >4 W/mm and 23% PAE at 35 GHz," IEEE Electron Device Lett., vol. 24, pp. 616-618, Oct. 2003.

F. Eastman, V. Tilak, J. Smart, B. M. Green, E. M. Chumbes, R. Dimitrov, H. Kim, O. S. Ambacher, N. Weimann, T. Prunty, M. Murphy, W. J. Schaff, and J. R. Shealy, "Undoped AlGaN/GaN HEMT's for microwave power application," IEEE Trans. Electron Devices, vol. 48, pp. 479-485, Mar. 2001.

R. Gaska, A. Osinsky, J.W. Yang, and M. S. Shur, "Self-heating in highpower AlGaN-GaN HFET's," IEEE Electron Device Lett., vol. 19, pp. 89-91, Mar. 1998.

A. Darwish, A. Bayba, and H. A. Hung, "Thermal resistance calculation of AlGaN/GaN on SiC devices," presented at the IEEE MTT-S Int. Microwave Symp., TX, 2004, Paper IFTH-55.

Ali Mohamed Darwish, Andrew J. Bayba, and H. Alfred Hung, "Accurate Determination of Thermal Resistance of FETs" IEEE Transactions on Microwave Theory and Techniques, vol. 53, No. 1, Jan. 2005.

S. Song, S. Lee, and V. Au, "Closed-form equation for thermal constriction/spreading resistances with variable resistance boundary condition," in Int. Electronics Packaging Soc. Conf., 1994, pp. 111-121.

D. Kennedy, "Spreading resistance in cylindrical semiconductor devices," J. Appl. Phys., vol. 31, pp. 1490-1497, 1960.

* cited by examiner

US 7,655,944 B1

SYSTEMS AND METHODS FOR ESTIMATING THERMAL RESISTANCE OF FIELD EFFECT TRANSISTOR STRUCTURES

GOVERNMENT INTEREST

The invention described herein may be manufactured, used, and licensed by or for the United States Government.

BACKGROUND

1. Technical Field

The present disclosure is generally related to electronic devices, and, more particularly, is related to thermal resistance estimation in field effect transistor structures.

2. Description of the Related Art

The reliability and performance of field effect transistors (FETs) and monolithic microwave integrated circuits (MMICs), particularly for power devices, depend critically on the operating channel temperature. For instance, the reliability and power performance of gallium nitride (GaN) devices depend critically on the operating channel (or junction) temperature. Power densities of up to 30 watts per millimeter (W/mm) have been obtained, usually from single (or double) finger (gate) devices, which typically run cooler than multi-finger devices (where lower power densities are generally observed for multi-finger devices). Lower power densities for multi-finger devices are mainly due to thermal effects. The device performance is thus critically affected by self-heating. The maximum allowed channel temperature largely drives the design of the cooling system, device package, and maximum direct current/radio frequency (direct current/radio frequency (DC/RF)) power limitations. Therefore, an accurate estimate of channel temperature is highly desirable during the device (or circuit) design phase.

Generally, the temperature behavior can be described using a three-dimensional Laplace equation defined as follows in equation (1):

$$\nabla^2 T(x,y,z)=0, \quad (1)$$

where $T(x, y, z)$ is the temperature at any point in space. For devices with some geometric configurations, such as concentric spheres, concentric cylinders, or parallel plates, Laplace's equation can be solved analytically in closed form. But for most geometric configurations, the solution for Laplace's equation is either intractable or results in infinite series summations. Hence, numerical solutions are more commonly pursued, and a number of simulators have been developed based on finite volume, finite difference, and finite element techniques.

However, solving Laplace's equation using numerical methods may not be practical for many circuit designers. For instance, solving Laplace's equation using numerical methods may require great effort (and time) to define the problem and the boundary conditions, and frequently, the solution does not converge. Also, solving Laplace's equation using numerical methods does not allow for interactive optimization of the device configuration with regard to thermal resistance during MMIC designs. Further, the software (e.g., simulators) to implement numerical methods is generally expensive and often unavailable to an MMIC designer.

For these reasons, among others, many designers rely on simplified models or formulas to estimate the channel temperature. Simplified models relate the device geometrical structure to the thermal resistance and are relatively easy to understand and apply. One drawback of using these simplified models is the inaccuracy of the result. A classical and popular method for calculating thermal resistance of a FET is an approximation based on Fourier's conduction law. This approach makes the assumption that heat transfer is confined to a 45 degree wedge of material between the gate and the base. The resulting equation (2) can be shown as follows:

$$\theta = \frac{t}{k(W_g + t)(L_g + t)}, \quad (2)$$

where $t$ is the substrate thickness, $k$ is the thermal conductivity, $W_g$ is a gate width and $L_g$ is a gate length. Although appreciated for its simplicity and ease of use, it has been shown to lack accuracy. Several modifications have been proposed to the formula above to improve its accuracy for different special cases (e.g., square, circular disk, etc.). However, the accuracy of the simple models, when applied to FET problems, remains an issue (percentage error±10-50%) because the heat source is a thin long line, not a circle or a square.

An analytical solution for a rectangular patch on a substrate and a circular patch on a cylinder is available in the form of an infinite series summation. The exact solution is the sum of three infinite series with the last term consisting of two nested infinite summations. After using the infinite series solution for a few cases, one quickly realizes that convergence is very slow with tens of thousands of terms required to arrive at a reasonable answer, assuming numerical instabilities and errors are kept under control.

Finally, earlier closed form expressions based on transmission line analogies have yielded results with 10-20% error.

SUMMARY

Embodiments of systems and methods for estimating channel temperatures of a field effect transistor structure are disclosed. One method embodiment, among others, comprises receiving geometrical values corresponding to a field effect transistor (FET) structure, and associating the geometrical values of the FET structure to elliptical cylinder and prolate spheroidal coordinates to provide a closed form expression.

Other systems, methods, features, and advantages of the present disclosure will be or become apparent to one with skill in the art upon examination of the following drawings and detailed description. It is intended that all such additional systems, methods, features, and advantages be included within this description and be within the scope of the disclosure.

BRIEF DESCRIPTION OF THE DRAWINGS

The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Figure 1A:
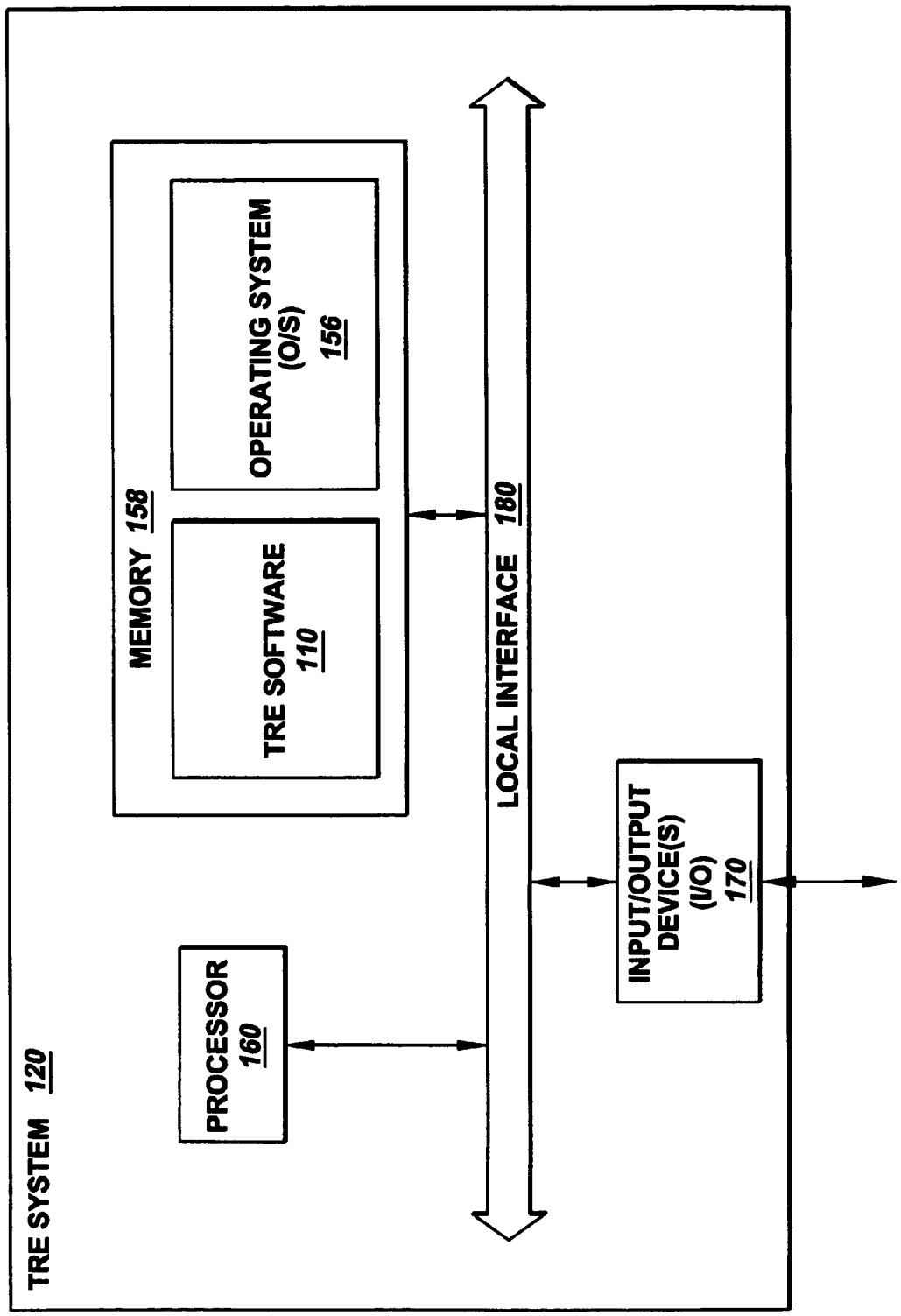
FIG. 1A is block diagram of an embodiment of a thermal resistance estimation system.

The availability of an analytical expression for the channel temperature of a field effect transistor (FET) structure is of great importance to designers of power devices and monolithic microwave integrated circuits (MMICs). An analytical expression can facilitate the optimization of the device layout to reduce the thermal resistance, and it can facilitate the study of how device parameters affect reliability. Disclosed herein are various embodiments of thermal resistance estimation (TRE) systems and methods, herein referred to as a TRE method or methods for brevity. The TRE methods disclosed herein comprise an accurate (within 1-2%) closed form expression or model that provides for visualization of temperature contours and insight into heat flow problems. Such a model takes into account the interaction of heat sources (i.e., gate fingers) and mimics the actual heat/temperature. By presenting an accurate model, accurate thermal calculations can be employed into or in cooperation with model-based computer-aided design (CAD) programs, which allows for the concurrent optimization of radio frequency (RF) and thermal performance. The TRE methods can thus accelerate the design cycle significantly.

In one embodiment, a TRE method comprises a model that estimates the thermal resistance of multi-finger FET structures based on device geometry, configuration, and material parameters. Such a model may be used to predict the hottest temperature on a device. The model is based on the solution of Laplace's equations in prolate spheroidal coordinates and elliptical cylinder coordinates. The model's validity has been verified by comparing the results with finite element simulations, and experimental observations from liquid crystal measurements and spatially resolved photoluminescence measurements. Excellent agreement has been obtained between the model and extensive numerical simulations across various variables, including substrate thickness, gate-pitch, gate-width and gate-length.

In another embodiment, a TRE method comprises a closed-form model for the thermal resistance of a multi-finger aluminum-gallium-nitride/gallium-nitride (AlGaN/GaN), high electron mobility transistor (HEMT) structure on a variety of host substrates including silicon-carbide (SiC), Si, sapphire, single crystal GaN, among others. Such a model takes into account the thickness of GaN and host substrate layers, the gate pitch, length, width, and thermal conductivity of GaN and the host substrate. The validity of the model has been verified by comparing it with experimental observations. In addition, the model compares favorably with the results of numerical simulations for many different devices (e.g., approximately 1-2% agreement has been observed).

Although described using gallium arsenide (GaAs) FET structures and GaN HEMT structures, the TRE methods also apply to other semiconductor materials such as silicon (Si) and silicon-germanium (SiGe). Also, one skilled in the art will understand that HEMT structures can be comprised of GaAs, among others materials. Further, one skilled in the art will understand that HEMT structures are a subcategory of FET structures, and that other FET structures, such as metal semiconductor FETs (MESFETs), among others, similarly apply. The principles disclosed herein may also be applied to other semiconductor devices, such as bipolar junction transistors, etc. The TRE methods can be readily used by device and MMIC designers to optimize the device geometry and configuration to achieve the desired electrical and thermal performance without invoking complex, time-consuming, and often non-converging numerical techniques. Incorporating the TRE methods into model-based CAD programs can be done easily, thereby enabling the concurrent optimization of RF and thermal performance and accelerating the design cycle.

FIG. 1A is a block diagram that illustrates an embodiment of a TRE system 120. The TRE system 120 may be embodied as or in a computer, a semiconductor chip, or other embedded device or devices. The TRE system 120 includes TRE software 110 that comprises models or equations that provide an estimate of channel temperatures in FET transistor structures. The TRE software 110, or like-functionality, can be implemented in whole or in part in the computer system 120. The TRE system 120 may include fewer or additional components. Generally, in terms of hardware architecture, the TRE system 120 includes a processor 160, memory 158, and one or more input and/or output (I/O) devices 170 that are communicatively coupled via a local interface 180. The local interface 180 can be, for example but not limited to, one or more buses or other wired or wireless connections. The local interface 180 may have additional elements, which are omitted for simplicity, such as controllers, buffers (caches), drivers, repeaters, and receivers, to enable communications. Further, the local interface 180 may include address, control, and/or data connections to enable appropriate communications among the aforementioned components.

The processor 160 is a hardware device for executing software, particularly that which is stored in memory 158. The processor 160 can be any custom made or commercially available processor, a central processing unit (CPU), an auxiliary processor among several processors associated with the TRE system 120, a semiconductor-based microprocessor (in the form of a microchip or chip set), a macroprocessor, or generally any device for executing software instructions.

Memory 158 can include any one or combination of volatile memory elements (e.g., random access memory (RAM, such as DRAM, SRAM, SDRAM, etc.)) and nonvolatile memory elements (e.g., read-only memory (ROM)). Memory 158 cooperates through the local interface 180. In some embodiments, memory 158 may incorporate electronic, magnetic, optical, and/or other types of storage media. Note that memory 158 can have a distributed architecture, where various components are situated remote from one another, but can be accessed by the processor 160.

Figure 1B:
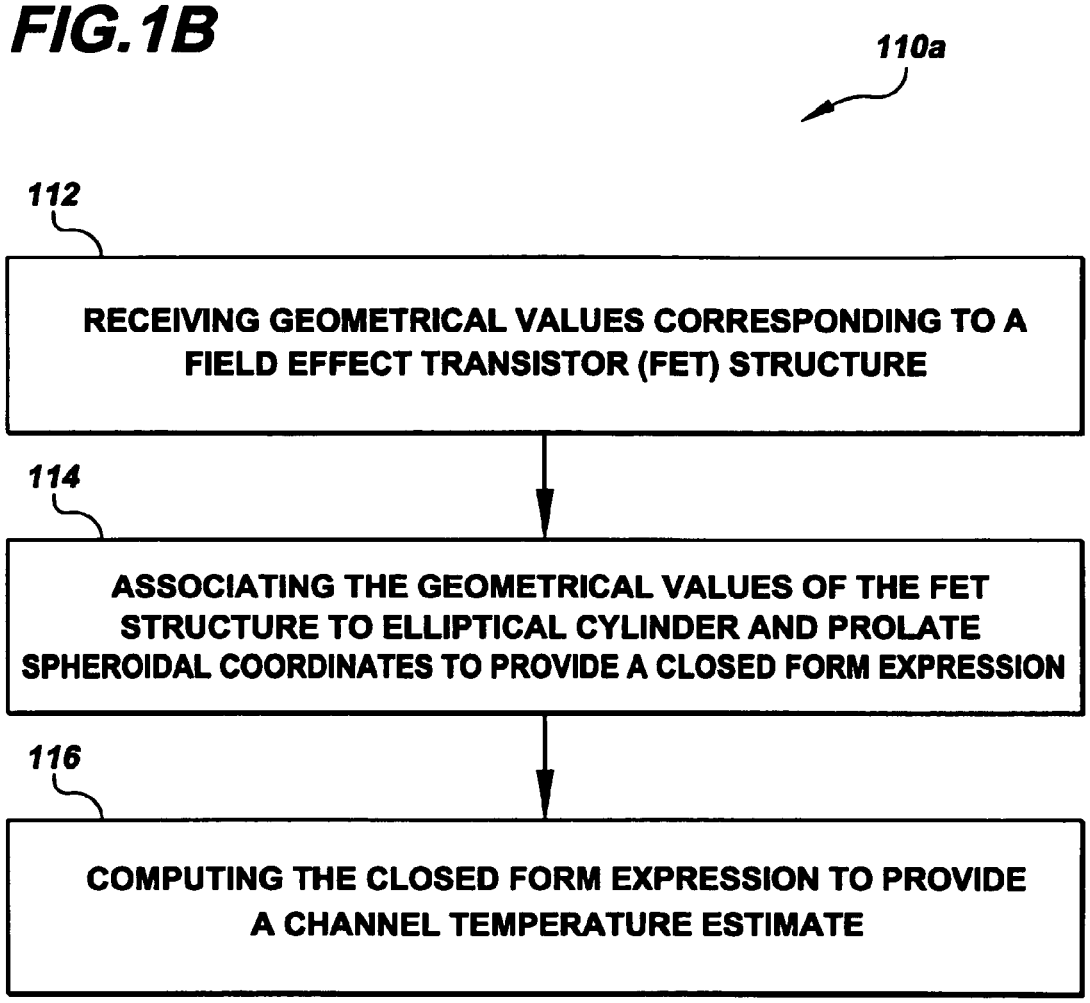
FIG. 1B is a flow diagram that illustrates an embodiment of a thermal resistance estimation method.

The software in memory 158 may include one or more separate programs, each of which comprises an ordered listing of executable instructions for implementing logical functions. In the example of FIG. 1B, the software in memory 158 includes a suitable operating system (O/S) 156, the TRE software 110, and other software, such as simulation software 114 (e.g., SPICE). In general, the operating system 156 essentially controls the execution of other computer programs, and provides scheduling, input-output control, file and data management, memory management, and communication control and related services.

The TRE software 110 is a source program, executable program (object code), script, or any other entity comprising a set of instructions to be performed. The TRE software 110 can be implemented as a single module or as a distributed network of modules of like-functionality. When the TRE software 110 is a source program, then the program is translated via a compiler, assembler, interpreter, or the like, which may or may not be included within the memory 158, so as to operate properly in connection with the O/S 156.

The I/O devices 170 may include input devices, for example but not limited to, a keyboard, mouse, scanner, microphone, etc. Furthermore, the I/O devices 170 may also include output devices, for example but not limited to, a printer, display, etc. Finally, the I/O devices 170 may further include devices that communicate both inputs and outputs, for instance but not limited to, a modulator/demodulator (modem for accessing another device, system, or network), an RF or other transceiver, a telephonic interface, a bridge, a router, etc.

When the TRE system 120 is in operation, the processor 160 is configured to execute software stored within the memory 158, to communicate data to and from the memory 158, and to generally control operations of the TRE system 120 pursuant to the software. For example, the TRE software 110, in whole or in part, is read by the processor 160, perhaps buffered within the processor 160, and then executed.

When the TRE software 110 is implemented in software, as is shown in FIG. 1A, it should be noted that the TRE software 110 can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The TRE software 110 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The computer-readable medium may be portable.

In one embodiment, where functionality of the TRE software 110 is implemented, in whole or in part, in hardware, such functionality can be implemented with any or a combination of the following technologies: a discrete logic circuit(s) having logic gates for implementing logic functions upon data signals, an ASIC having appropriate combinational logic gates, a programmable gate array(s) (PGA), a field programmable gate array (FPGA), etc.

Any process descriptions or blocks in flow diagrams used herein should be understood as representing modules, segments, or portions of code which include one or more executable instructions for implementing specific logical functions or steps in the process, and alternate implementations are included within the scope of the disclosure in which functions may be executed out of order from that shown or discussed, including substantially concurrently or in reverse order, depending on the functionality involved.

FIG. 1B is a flow diagram that illustrates one embodiment of a TRE method 110a. The TRE method 110a comprises, in one embodiment, receiving geometrical values corresponding to a field effect transistor (FET) structure (112), associating the geometrical values of the FET structure to elliptical cylinder and prolate spheroidal coordinates to provide a closed form expression (114), and computing the closed form expression to provide a channel temperature estimate (116). Although described in the context of a single substrate layer FET structure, it will be understood that similar methodology applies with some variations for FET structures having additional layers, such as a buffer layer as is described in association with FIGS. 9-13.

Figure 2:
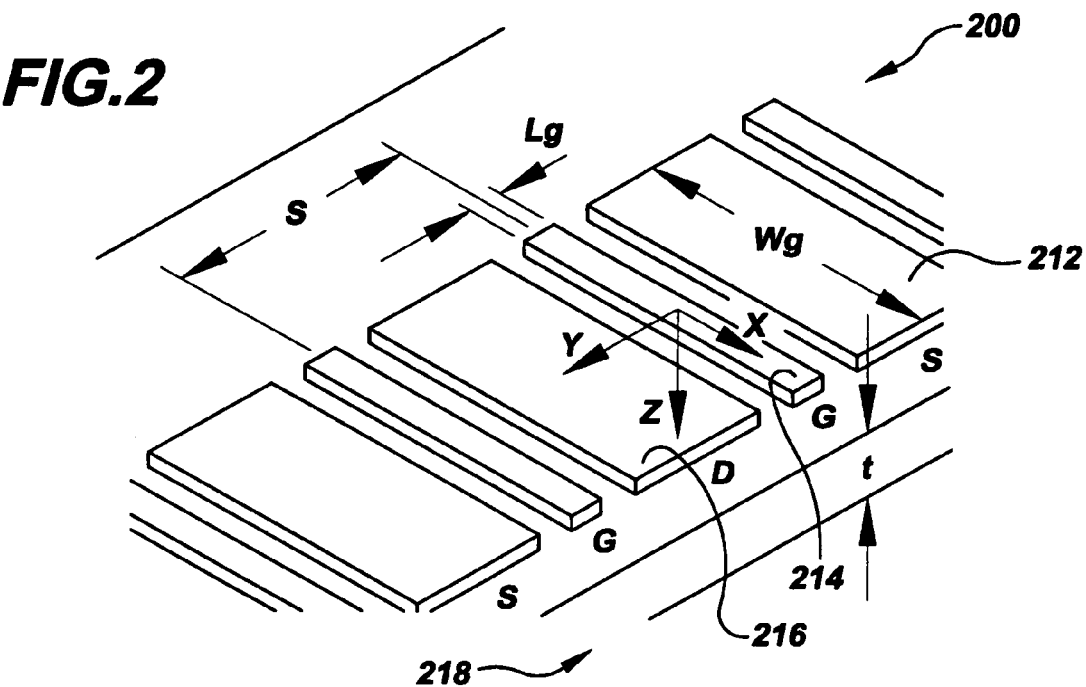
FIG. 2 is a schematic diagram of an exemplary field effect transistor (FET) structure.

FIG. 2 is a schematic diagram of an exemplary field effect transistor (FET) structure 200. The FET structure comprises one or more of a source 212, gate (finger) 214, and drain 216 that are disposed on a substrate 218. The substrate 218 has a thickness t and constant thermal conductivity, k. The gate 214 represents a heat source with length $L_g$ and width $W_g$, and the gate-gate spacing is s. The substrate 218 is assumed to be large enough that it has no effect (no constraining of heat) on the temperature, which is generally true in practice. The following boundary conditions are assumed: a constant heat flux Q over a surface area $L_g \times W_g$ represents the dissipated power; all surfaces (except bottom of substrate 218 where z=t) are adiabatic (no heat flux allowed); the bottom of the substrate 218 is an isothermal surface (constant temperature). The TRE methods 110a calculate the thermal resistance and hence find the maximum channel temperature (directly under the gate 212). A derivation of a model according to one TRE method embodiment 110a-1 follows in association with FIGS. 2-6.

Figure 3:
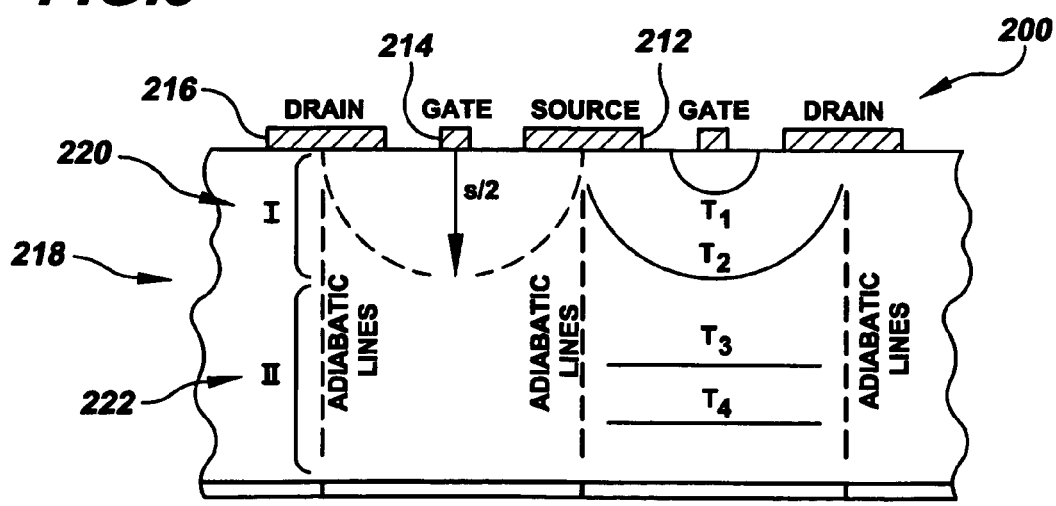
FIG. 3 is a cross sectional, front elevation view of the FET structure shown in FIG. 2.

FIG. 3 is a cross sectional, front elevation view of the FET structure 200. The FET structure 200 comprises the source 212, gate 214, and drain 216 on substrate 218. A model of the TRE method 110a-1 is derived at least partly as a result of observations of heat flux behavior in FET structures using finite element simulations. For instance, it was observed that for a FET having multiple fingers, the outer fingers are the coolest and the fingers in the middle are the hottest. Since the middle fingers are surrounded to the left and right with many fingers, it is appropriate to assign adiabatic surfaces between each finger and the next, as indicated by the dashed lines in FIG. 3. In reality, only the neighboring fingers positioned within one (or two) substrate height contribute heat. This leads to an equivalent thermal model with an infinite number of fingers to the right and left of the middle finger. For example, for a 100 micro-meter (μm) thick substrate 218 and 40 μm gate pitch (s), only two (or four) fingers on each side contribute heat to the center finger. The rest have negligible effect.

As another observation, heat propagation can be divided into two regions 220 (also designated using Roman numeral I) and 222 (also designated using Roman numeral II). In region I 220, heat propagates in a radial direction producing isothermal lines such as T1 and T2. In region II 222, heat propagates downward, producing isothermal lines such as T3 and T4. In region I 220, heat propagates in an ellipsoidal manner. In region II 222, the propagation is similar to an elliptic cylinders case.

Figure 4:
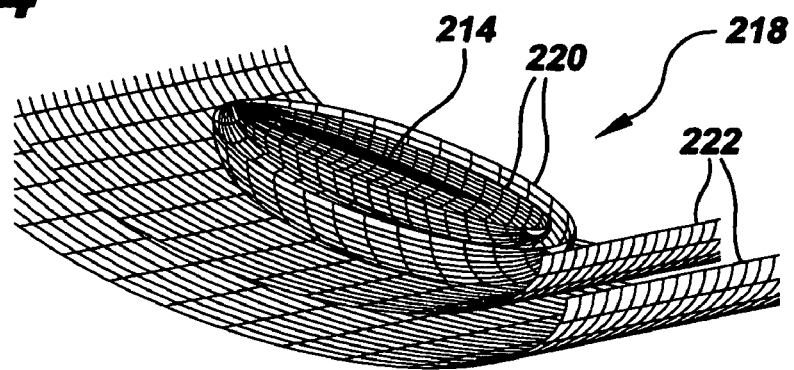
FIG. 4 is a three-dimensional view of isothermal surfaces for one gate finger of the FET structure shown in FIG. 2.

FIG. 4 is a three-dimensional view of isothermal surfaces for one gate finger of the FET structure 200, showing the gate finger 214 and the substrate 218 regions, including region I 220 and region II 222. The total thermal resistance equals the sum of the thermal resistances of region I 220 and II 222, as defined in equation (3) below:

$$\theta_{total} = \theta_I + \theta_{II} \qquad (3)$$

Figure 5:
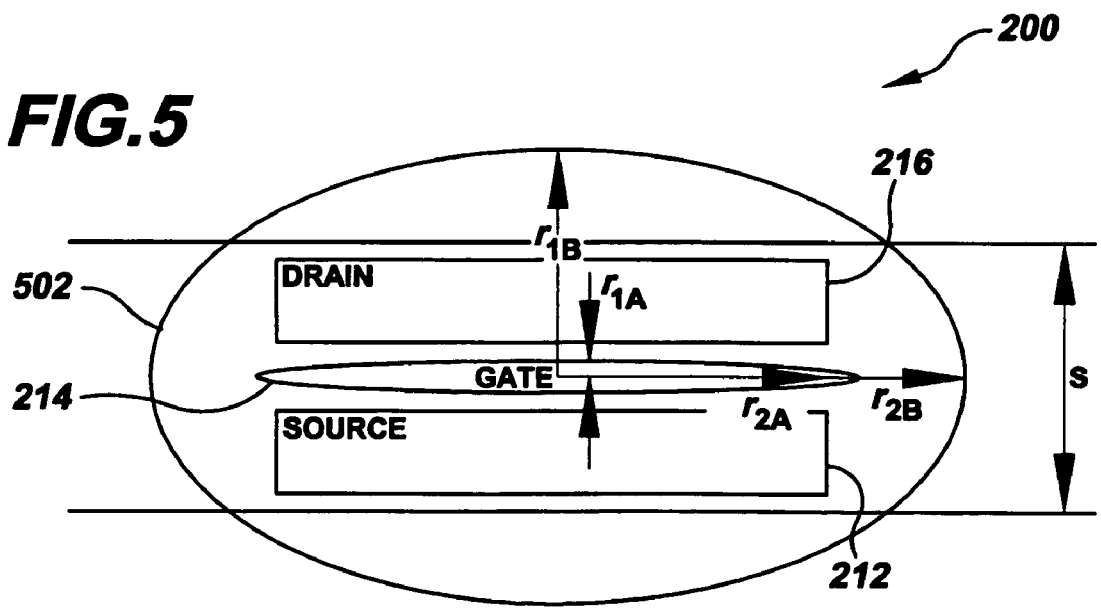
FIG. 5 is a top plan view of a unit cell of the FET structure shown in FIG. 2.

FIG. 5 is a top plan view of a unit cell 502 of the FET structure 200, and is used to illustrate the derivation of the thermal resistance in region I 220. Shown are the source 212, gate 214, and drain 216. In prolate spheroidal coordinates, Laplace's equation has an exact solution. Namely, the thermal resistance between two half-plane confocal ellipsoids with A, the inner, and B, the outer ellipsoid, with minor axes $r_{1A}$ and $r_{1B}$, respectively, and major axes $r_{2A}$ and $r_{2B}$, respectively, is described by the following equation (4):

$$\theta_I = \frac{1}{2\pi R k}(\ln[\tanh(\frac{\varphi_B}{2})] - \ln[\tanh(\frac{\varphi_A}{2})]) \tag{4}$$

where $$\varphi_A = \frac{1}{2}\ln\left(\frac{r_{2A}+r_{1A}}{r_{2A}-r_{1A}}\right) \varphi_B = \frac{1}{2}\ln\left(\frac{r_{2B}+r_{1B}}{r_{2B}-r_{1B}}\right) \quad R = \sqrt{r_{2A}^2 - r_{1A}^2} = \sqrt{r_{2B}^2 - r_{1B}^2}$$

To relate $r_{1A}$, $r_{2A}$, $r_{1B}$, and $r_{2B}$ to the current case (region I 220), it is appropriate to select the dimensions of the inner ellipsoid, representing the heat source (i.e., gate finger 214), as follows, $$r_{1A}=L_g/2 \quad r_{2A}=W_g/2$$

Given that $W_g \gg L_g$ (e.g. 100 μm vs. 0.25 μm), R can be approximated by, $$R = \sqrt{(W_g/2)^2 - (L_g/2)^2} \cong W_g/2$$

Relating $r_{1B}$ to the gate spacing, s, in light of the geometry shown in FIG. 5, if $r_{1B}=s/2$ is selected, then the thermal resistance is underestimated. If $r_{1B}=s$ is selected, then the resistance is overestimated. Therefore an appropriate estimate is the geometric mean of the two extremes, $$r_{1B} = s/\sqrt{2}.$$

Thus, $$r_{1B} = s/\sqrt{2}$$

hence, $$r_{2B} = \sqrt{R^2 + r_{1B}^2} \cong \sqrt{(W_g/2)^2 + s^2/2}$$

Substituting back into equation (4) we obtain equation (5) below:

$$\theta_I = \frac{1}{\pi W_g k}\ln\left[\frac{f(g(\sqrt{2}\,s)+1)-1}{f(g(\sqrt{2}\,s)+1)+1} \cdot \frac{f(g(L_g))+1}{f(g(L_g))-1}\right] \tag{5}$$

where $$f(x) = \sqrt{\frac{\sqrt{x}+1}{\sqrt{x}-1}} \quad g(y) = \left(\frac{W_g}{y}\right)^2$$

Figure 6:
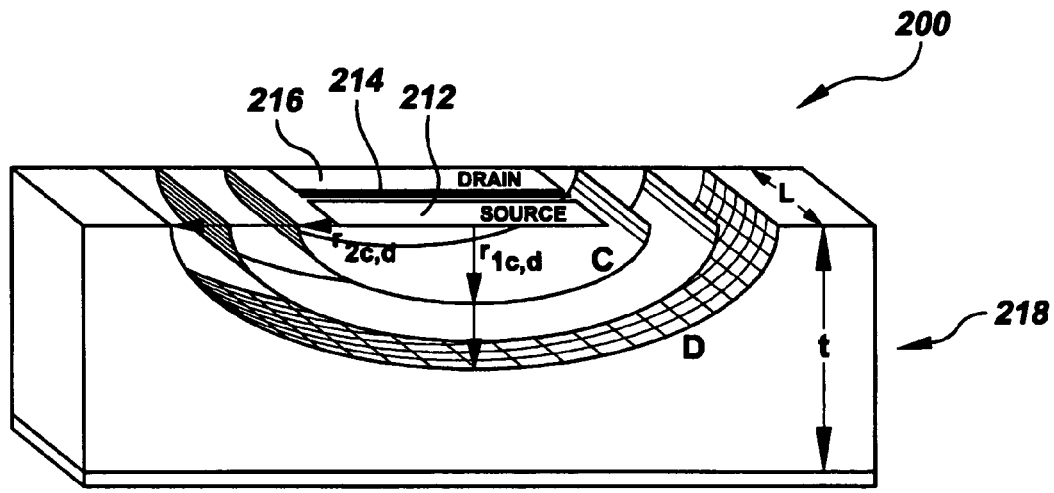
FIG. 6 is a side cut-away view of the FET structure shown in FIG. 2 illustrating isothermal lines.

FIG. 6 is a side cut-away view of the FET structure 200 showing isothermal lines, and is used to illustrate the derivation of the thermal resistance in region II 222. Finite element simulation has resulted in the observation that isothermal lines approach an elliptic cylinder shape. This observation suggests that elliptical cylinder coordinates may be the most suitable, as illustrated in FIG. 6, which shows the source 212, gate 214, drain 216, and confocal elliptical cylinders C and D corresponding to substrate 218. Given the two half-plane confocal elliptical cylinders, C and D, with minor axes $r_{1C}$ and $r_{1D}$, and major axes $r_{2C}$ and $r_{2D}$ respectively and length L, the thermal resistance between them is described by equation (6) below:

$$\theta_{II} = \frac{1}{\pi L k}(\eta_D - \eta_C) \tag{6}$$

where $$\eta_C = \frac{1}{2}\ln\left(\frac{r_{2C}+r_{1C}}{r_{2C}-r_{1C}}\right) \quad \eta_D = \frac{1}{2}\ln\left(\frac{r_{2D}+r_{1D}}{r_{2D}-r_{1D}}\right)$$

provided $$\Re = \sqrt{r_{2C}^2 - r_{1C}^2} = \sqrt{r_{2D}^2 - r_{1D}^2}$$

Relating L, $r_{1C}$, $r_{2C}$, $r_{1D}$, and $r_{2D}$ to the current case (region II 222), from FIG. 4, it is reasonable to equate the dimensions of the inner ellipse (of region II 222) to the outer prolate ellipsoid of region I 220, and assign L equal to s, $$L=s$$

$$r_{1C} = r_{1B} = s/\sqrt{2}$$

$$r_{2C} = r_{2B} = \sqrt{(W_g/2)^2 + s^2/2}$$

Hence, $$\Re = W_g/2$$

Then, $r_{1D}$ can be related to the substrate thickness, t with respect to the geometry illustrated in FIG. 5. Note that $r_{1D}=c$ t, where c is a constant between 1 (an underestimate) and 2 (an overestimate). To determine the proper value for c, the two extremes can be averaged (leading to c=(1+2)/2=1.5) or c can be empirically determined by evaluating a number of cases using numerical analysis. Pursuing the second approach, it is found that a good approximation is c=1.6. Substituting back into equation (6), the thermal resistance is obtained as described in equation (7):

$$\theta_{II} = \frac{1}{2\pi sk} \ln\left[\frac{h(2.3t)}{h(s)}\right] \quad (7)$$

where $$h(x) = \frac{\sqrt{2x^2 + W_g^2} + \sqrt{2}\,x}{\sqrt{2x^2 + W_g^2} - \sqrt{2}\,x}$$

The above results can be summarized to evaluate the total thermal resistance from equation (3) as defined in equation (8):

$$\theta_{total} = \frac{1}{\pi W_g k} \ln\left(\frac{V[f(g[\sqrt{2}\,s] + 1)]}{V[f(g[L_g])]}\right) + \frac{1}{2\pi sk} \ln\left(\frac{h(2.3t)}{h(s)}\right) \quad (8)$$

where, $$h(x) = \frac{\sqrt{1 + g(\sqrt{2}\,x)} + 1}{\sqrt{1 + g(\sqrt{2}\,x)} - 1}, \quad V(z) = \frac{z-1}{z+1},$$

$$f(w) = \sqrt{\frac{\sqrt{w}+1}{\sqrt{w}-1}}, \quad g(y) = \left(\frac{W_g}{y}\right)^2$$

The expression or model corresponding to TRE method 110a-1 above (Equation (8)) provides the temperature at the center (hottest region) of the device.

Figure 7:
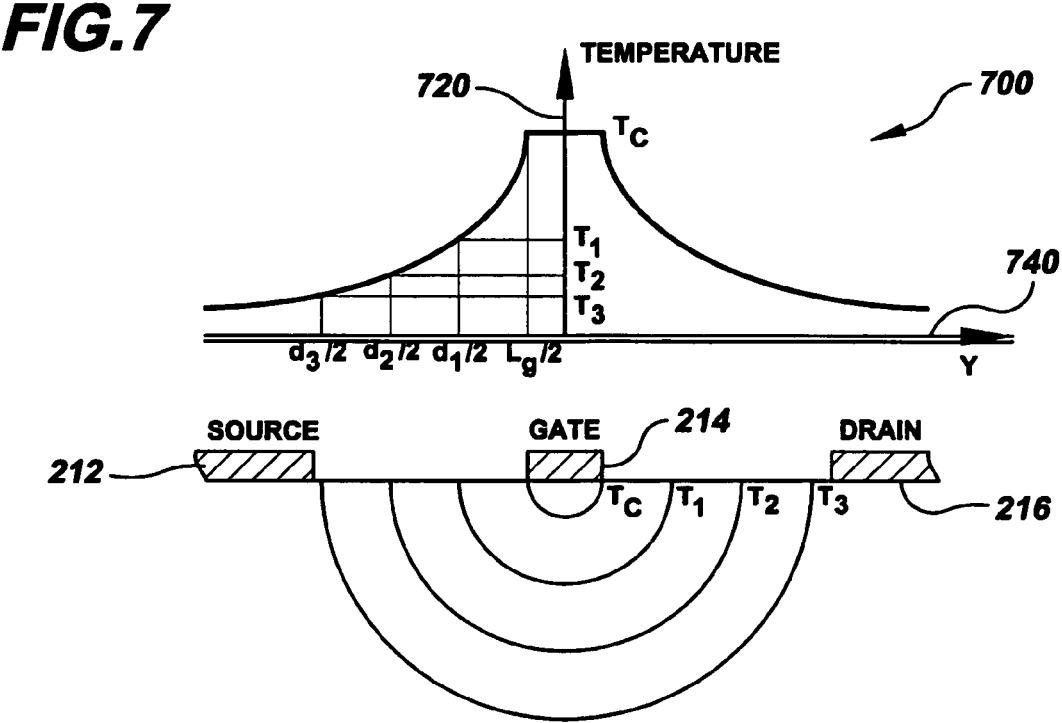
FIG. 7 is a schematic diagram of a temperature profile of isothermal surfaces.

Experimentally, it is difficult to measure the temperature right at the channel (at the gate edge) due to the infinitesimal size of the gate. Thus, the temperature is often measured close to the channel. FIG. 7 is a schematic diagram of a temperature profile 700 of isothermal surfaces, and illustrates how temperature drops with distance away from the channel. The y-axis 720 corresponds to channel temperature, and the x-axis 740 corresponds to distance from the gate. Consider the temperature profile 700 at the cross section of the FET structure 200 comprising the source 212, gate 214, and drain 216. The cross section shows isothermal surfaces, $T_c$, $T_1$, $T_2$, and $T_3$, at displacements $L_g/2$, $d_1/2$, $d_2/2$, and $d_3/2$, respectively. Given a displacement $d/2$, it is straightforward to calculate the temperature ($T_{d/2}$) at $d/2$ displacement from the gate 214. The derived model above gives $T_c$ as $P\Delta\theta_{total}$, where P is the total dissipated power. It is evident that, $$T_{d/2} = T_c - \Delta T = T_c - P\Delta\theta_{total} \quad (9)$$

where $\Delta\theta_{total}$ is the thermal resistance between the two isothermal surfaces at $L_g/2$ and $d/2$. If the displacement from the heat source $d/2$ is less than $s/2$ (thus remaining in region I 220), then $T_{d/2}$ can be calculated as, $$T_{d/2} = T_c - P\Delta\theta_{total} \quad (10)$$

$$= T_c - P[\theta_{total}(L_g) - \theta_{total}(d)]$$

$$= T_c - \frac{P}{\pi W_g k} \ln\left(\frac{V[f(g[d])]}{V[f(g[L_g])]}\right)$$

In the typical case, $W_g \gg L_g$ and $W_g \gg d$ and hence the expression above can be simplified as, $$T_{d/2} = T_c - \frac{P}{\pi W_g k} \ln\left(\frac{d}{L_g}\right) \quad (11)$$

This expression indicates that the temperature falls off logarithmically away from the gate 214 (heat source). Thus, if the temperature is measured a few microns away from the gate 214, it will be significantly different from that at the gate edge.

In deriving the present model, optimal accuracy is observed by maintaining the following preferred conditions: the heat source is long and thin (i.e., $W_g \gg L_g$ and $t \gg L_g$), which is true in most if not all FET geometries; there are at least two gate fingers on each side of the center gate finger in order to justify the adiabatic boundary conditions (e.g., power FETs have multiple parallel fingers); and the metal thickness of gate, drain, and source is thin enough (e.g., less than 2 μm) that heat conduction through them can be ignored, which is typically the case.

Additionally, the thermal conductivity k is temperature dependent. The temperature dependency can be easily taken into account analytically without any approximation using Kirchhoff's transformation once the temperature-independent thermal resistance is calculated using the model described above. For example, consider the case of GaAs where the thermal conductivity is curve fitted from 300-600 Kelvin (with −0.8% to 1.3% error) as:

$$k(T) = 568.73 T^{-1.23} (\text{W/cm K}) \quad (12)$$

Once the thermal resistance is calculated from equation (8), then the temperature dependence of k can be taken into account by applying Kirchhoff's transformation on equation (12) which gives, $$T_c = (T_o^{-0.23} - 0.23[\theta_{total}{}^s P] T_o^{-1.23})^{(-1/0.23)} \quad (13)$$

where $T_o$ is the base plate temperature in degrees Kelvin.

The submicron gate length dimension makes it very challenging to accurately measure the temperature right at the channel (FET gate edge). Nonetheless, several measurements with varying spatial resolutions have been reported using spatially resolved photoluminescence and liquid crystal techniques. In calculating the channel temperature, the nonlinearity of the thermal conductivity is taken into account to arrive at the correct answer. The semiconductor material in the examples below is GaAs, however, the model works equally well for silicon-based devices.

Consider an exemplary GaAs MESFET power amplifier with the following parameters: gate-gate spacing (20 μm), gate length (0.5 μm), gate width (62.5 μm), number of gates (80), substrate thickness (100 μm), base plate temperature (125° C.), and power input (0.0625 W/gate). Using equation (8) and taking into account the temperature-dependent nature of semiconductors, equation (13), the resulting channel temperature equals $T_c$=497 K. The measured and calculated channel temperatures are as follows:

Measured $T_c$=228° C.

Calculated $T_c$=226° C.

As shown, very close agreement is observed.

In addition to the above, channel temperature measurements on GaAs dense array amplifiers have been reported (see J. Wright, B. W. Marks, and K. D. Decker, "Modeling of MMIC Devices for Determining MMIC Channel Temperatures During Life Tests," $7^{th}$ IEEE SEMI-THERM Symposium, pp. 131-139, 1991) according to the following parameters: gate-gate spacing (26 μm), gate length (0.5 μm), gate width (37.5 μm), number of gates (10), substrate thickness (100 μm), base plate temperature (125° C.), power input 0.8 W/mm (or 0.03 W/gate). The measured and calculated channel temperatures are as follows:

Measured $T_c$=170° C.

Calculated $T_c$=178° C.

As shown, reasonably close agreement is observed.

Consider spatially resolved photoluminescence measurements, for instance as reported in J. P. Landesman, E. Martin, and P. Braun, "Temperature Distribution in Power GaAs Field Effect Transistors Using spatially Resolved Photoluminescence Mapping," Proc. Of $7^{th}$ IPFA, pp. 185-190, 1999 for GaAs pHEMT devices. This is a relatively accurate approach to measuring the channel temperature without perturbing the device. Basically, a laser is focused into a small spot (about 1 μm in diameter) on the gate finger. The resulting photoluminescence gives a direct measure of the band gap of the material. Knowing the dependence of the bandgap on temperature, the channel temperature can be measured with great resolution. In one case, the laser was focused about 0.75 μm away from the gate finger. The following device parameters were used: gate-gate spacing (30 μm), gate length (0.25 μm), gate width (50 μm), number of gates (4), substrate thickness (100 μm), thermal conductivity (0.47 W/K cm), power input, variable.

Figure 8:
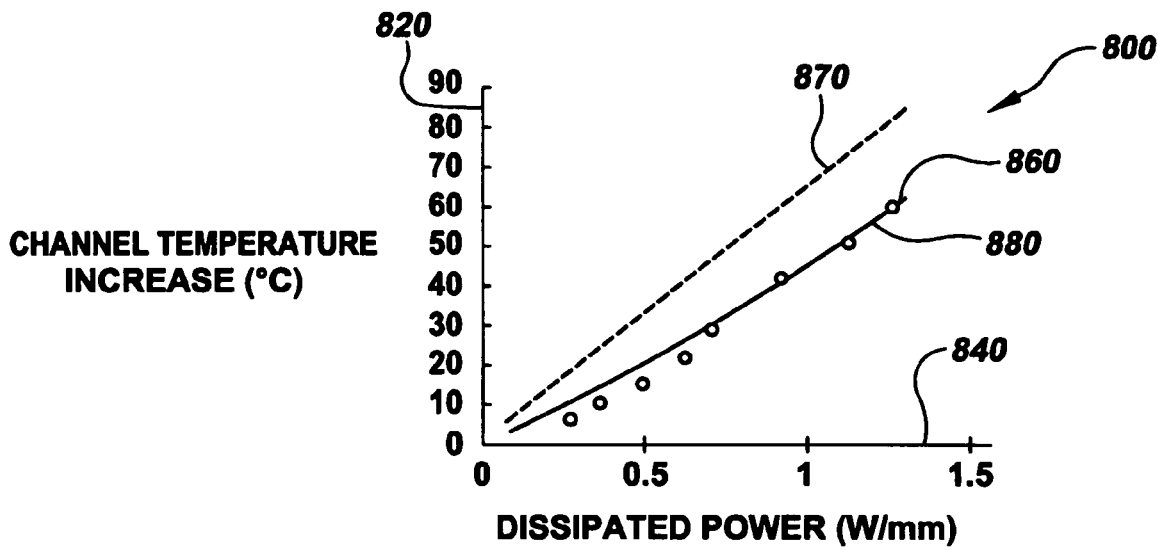
FIG. 8 is a plot that illustrates modeled and measured channel temperatures for a FET structure.

Applying equation (13) with the above parameters and variable input power, FIG. 8 is obtained. Equation (11) was applied with d/2=0.75 μm to account for the 0.75 μm displacement from the heat source. As shown, FIG. 8 is a plot 800 of channel temperature increase in degrees Celsius (y-axis 820) versus dissipated power in W/mm (x-axis 840). The model corresponding to TRE method 110a-1 corresponds to solid line 880, the measured data corresponds to data represented by symbols (circles) 860, and a classical Cooke's model is represented by dotted line 870. Close agreement is observed between the TRE model and measured channel temperature.

Figure 9:
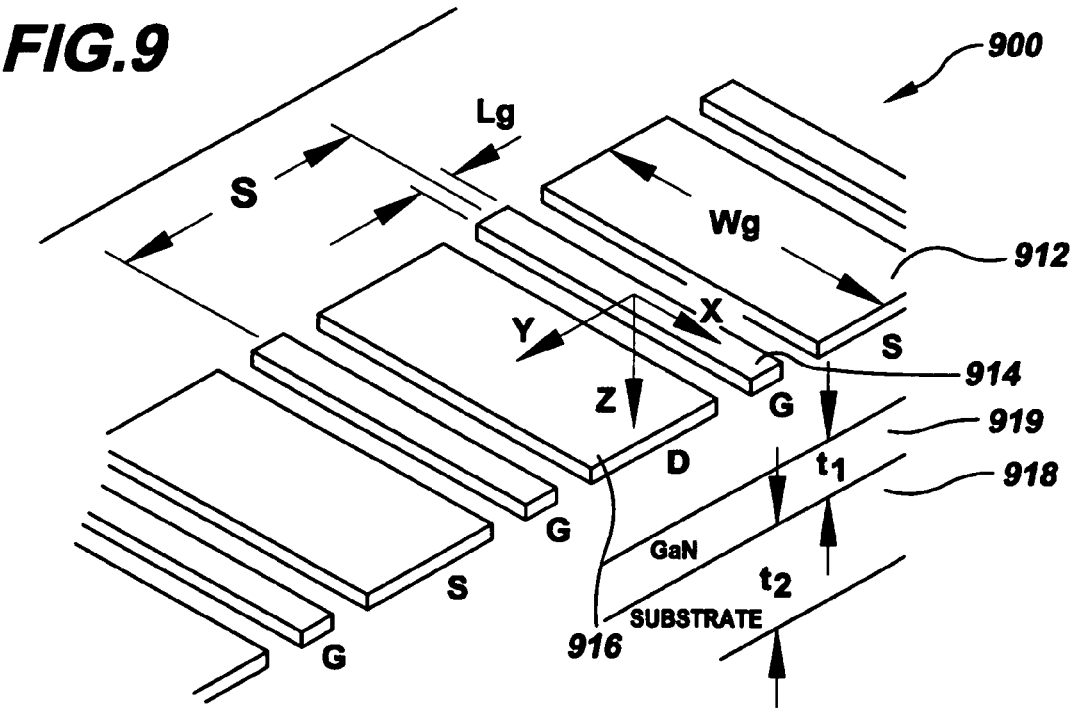
FIG. 9 is a schematic diagram of an exemplary high electron mobility transistor (HEMT) structure.

FIG. 9 is a schematic diagram of an exemplary GaN high electron mobility transistor (HEMT) structure 900. The HEMT structure 900 comprises one or more of a source 912, gate 914, and drain 916 disposed on a GaN layer 919 (also referred to as a buffer layer), which is disposed on a substrate 918. Consider that the HEMT structure 900 has a constant highly localized heat source on the substrate 918, the substrate having a thickness $t_2$. The gate 914 of the structure 900 represents a heat source with length $L_g$ and width $W_g$, gate-gate spacing s, and GaN layer thickness $t_1$. The substrate 918 is assumed to be wide enough that it has no effect on the temperature (no constraint of heat flux). The following boundary conditions are assumed: the dissipated power generates a constant heat flux directly under the gates (surface area of heat source is $L_g \times W_g$ for each gate); all surfaces (except bottom of substrate) are adiabatic, no heat flux allowed; the bottom of the substrate is an isothermal surface (constant temperature) plane; the substrates used (GaN, SiC, Si or Sapphire) have a constant thermal conductivity, k.

Figure 10:
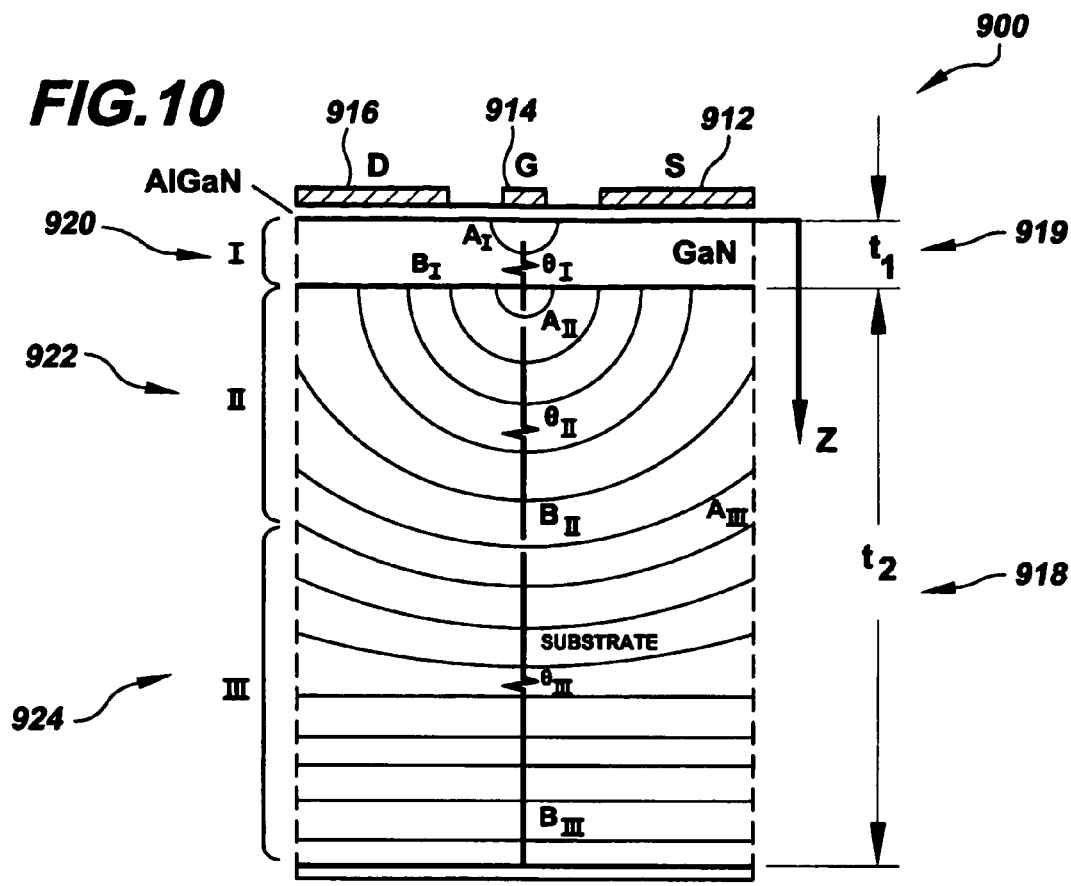
FIG. 10 is a cross sectional, front elevation view of the HEMT structure shown in FIG. 9 illustrating isothermal surfaces.

FIG. 10 is a cross sectional, front elevation view of the HEMT structure 900 illustrating isothermal surfaces. In the analysis to follow, the AlGaN barrier layer 919 is assumed to have no effect on the thermal resistance because it is typically very thin and has negligible thermal resistance. Additionally, any nucleation layer (between the substrate 918 and GaN layer 919) has negligible thickness and hence has minimal thermal influence. Numerical analysis was used to verify that the barrier 919 and nucleation layers have trivial effect on the thermal resistance.

The HEMT structure 900 is viewed as a two layer problem with a long and thin heat source on the top and an isothermal base at the bottom. The problem can be divided into three distinct regions: region I 920, region II 922, and region III 924. Region I 920 is contained in the GaN buffer layer 919. Regions II 922 and III 924 are contained in the substrate 918 with region II 922 being closest to the GaN interface 919. The following observations and assumptions lead to another TRE method embodiment 110a-2: for a HEMT having multiple fingers, the outer fingers are the coolest; the fingers in the middle are the hottest; the middle fingers are surrounded to the left and right with many fingers and it is assumed that adiabatic planes exist between each finger and the next, as shown by the dashed lines in FIG. 10.

Figure 11:
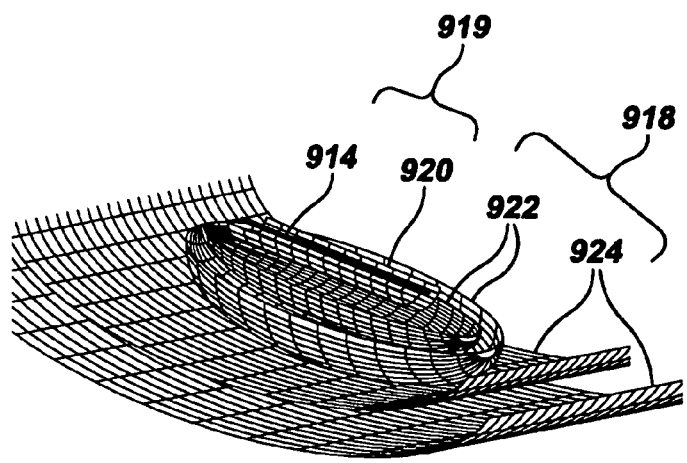
FIG. 11 is a three-dimensional view of isothermal surfaces for one gate finger of the HEMT structure shown in FIG. 9.
Figure 12:
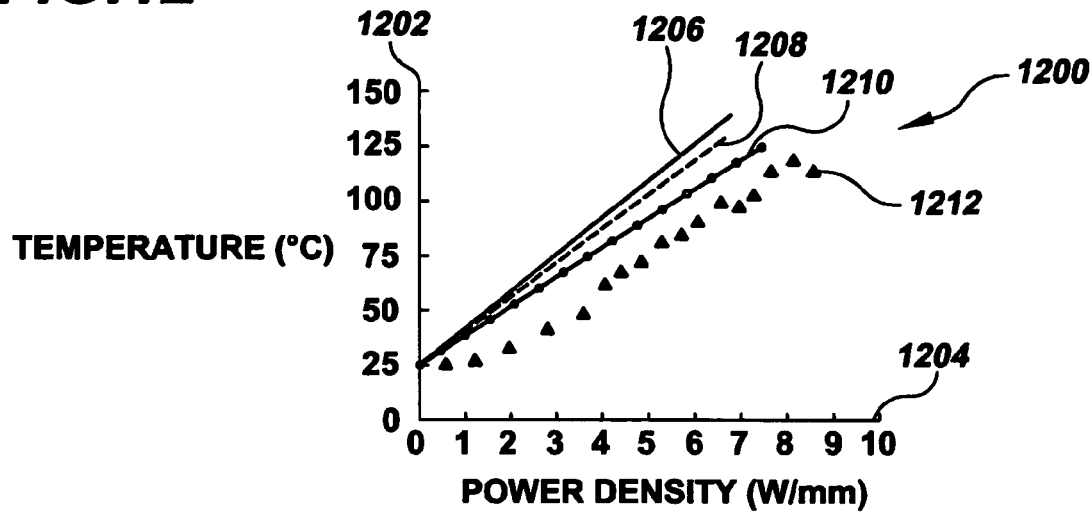
FIG. 12 is a plot that illustrates modeled and measured channel temperatures for a HEMT structure.

Referring to FIGS. 10 and 11, in region I 920, isothermal surfaces propagate as circular cylinders with the cylinder length projecting into and out of the page. In region II 922, isothermal surfaces propagate as prolate spheroids. In region III 924, isothermal surfaces propagate as elliptic cylinders, with the cylinder length horizontal (left to right of page). The total thermal resistance equals the sum of the thermal resistances of all regions:

$$\theta_{total} = \theta_I + \theta_{II} + \theta_{III}$$

The thermal resistance of region I 920 is the resistance between surface $B_I$ and $A_I$ (see FIG. 10). The resistance for region II 922 is between surface $B_{II}$ and $A_{II}$ (see FIG. 10). The resistance for region III 924 is between surface $B_{III}$ and $A_{III}$ (see FIG. 10). In the following description, the thermal resistance of each region shall be evaluated.

The resistance of the GaN layer 919 can be estimated by using the resistance of a cylinder between two planes. Inspection of FIGS. 10 and 11 suggest the following assignments for region I 920:

$W = W_g$, $k = k_{GaN}$

For surface $A_I$, the radius is roughly equal to $L_g$. Hence, $$\theta_I = \frac{1}{\pi W_g k_{GaN}} \ln\left(\frac{4t_1}{\pi L_g}\right)$$

In region II 922, the isothermal surfaces are assumed to be prolate spheroids and hence Laplace's equation solution for prolate spheroids shall be used. Inspection of FIG. 10 suggests the following assignments:

$k = k_{Sub}$.

The inner prolate spheroid is expected to have a major radius equal to half the gate width, $r_{2A}^{II} = W_g/2$ For the inner prolate spheroid, the minor radius is expected to be proportional to $t_1$ and thus $r_{1A}^{II} = c\, t_1$ where c is estimated to be $4/\pi^2$ based on geometrical reasoning. The inner radius is also expected to be proportional to the ratio of thermal conductivities of the two materials. The reason for this is that a poor thermal substrate, for example, will impede the heat flow and act as a bottleneck leading to higher thermal resistance. This bottle neck effect can be accounted for by reducing the minor radius of the prolate spheroid by the ratio of $k_{GaN}/k_{Sub}$. The opposite is also true for a good thermal substrate. Thus the minor radius is chosen as:

$r_{1A}^{II} = (4k_{GaN}/\pi^2 k_{Sub}) t_1$

The inner spheroid is now completely specified. The outer spheroid should cover the resistance up to the adiabatic line located s/2 away from center. The correct choice for the minor radius of the outer spheroid is $(a \cdot s/2) = \sqrt{2}\, s/2$. Thus, $$r_{1B}^{II} = s/\sqrt{2}$$

The major radius can be deduced from R, $$R = \sqrt{[W_g/2]^2 - [(4k_{GaN}/\pi^2 k_{Sub})t_1]^2} = \sqrt{[r_{2B}^{II}]^2 - [s/\sqrt{2}]^2}$$

$$[r_{2B}^{II}]^2 = [W_g/2]^2 - [(4k_{GaN}/\pi^2 k_{Sub})t_1]^2 + (s^2/2)$$

Now the thermal resistance equations can be simplified. The result for region II 922 is, $$\theta_{II} = \frac{1}{\pi W_g k_{Sub}} \cdot$$

$$\ln\left(\frac{f(g(r_{1A}^{II}, W_g/2))}{f\left(g\left(\sqrt{2}\,s, \sqrt{W_g^2 - [r_{1A}^{II}]^2 + 2s^2}\right)\right)}\right)$$

where $$f(x) = \frac{\sqrt{x+1} + \sqrt{x-1}}{\sqrt{x+1} - \sqrt{x-1}} \quad g(y,z) = \frac{z}{y}$$

$$R \approx W_g/2$$

In region III 924, the isothermal surfaces are assumed to be elliptic cylinders and hence Laplace's equation solution for elliptic cylindrical coordinates is used. The radii of region III's inner surface ($A_{III}$) is matched with region II's outer surface ($B_{II}$):

$r_{1A}^{III} = r_{1B}^{II} \quad r_{2A}^{III} = r_{2B}^{II}$

Since the cylinders run perpendicular to the gate fingers, the length L is set equal to the gate spacing s, $L = s \quad k = k_{Sub}$.

The inner elliptic cylinder is now completely specified. The outer elliptic cylinder covers the resistance up to the bottom plane located $t_1 + t_2 \approx t_2$ away from gate center. The correct choice for the minor radius of the outer elliptic cylinder is equal to $(a \cdot (t_1 + t_2))$ where $a = \pi/2$. Thus, $r_{1B}^{III} = \pi t_2/2$ The major radius can be deduced from the fact that, $$\sqrt{[r_{2A}^{III}]^2 - [r_{1A}^{III}]^2} = \sqrt{[r_{2B}^{III}]^2 - [r_{1B}^{III}]^2}$$

Thus, $[r_{2B}^{III}]^2 = [r_{1B}^{III}]^2 + [r_{2A}^{III}]^2 - [r_{1A}^{III}]^2$ Now the thermal resistance equations can be simplified. The result for region III 924 is, $$\theta_{III} = \frac{1}{\pi s k_{Sub}} \cdot$$

$$\ln\left(\frac{h((W_g/\pi t_2)^2 - 4(r_{1A}^{II}/\pi t_2)^2)}{h((W_g/\sqrt{2}\,s)^2 - 4(r_{1A}^{II}/\sqrt{2}\,s)^2)}\right)$$

where $$h(x) = \sqrt{\frac{\sqrt{x+1} + 1}{\sqrt{x+1} - 1}}$$

At this point, the above results can be summarized and the total thermal resistance is evaluated as, $$\theta_{total} = \theta_I + \theta_{II} + \theta_{III}$$

$$\theta_{total} = \frac{1}{\pi W_g k_{GaN}} \ln\left(\frac{4t_1}{\pi L_g}\right) + \frac{1}{\pi W_g k_{Sub}} \cdot$$

$$\ln\left(\frac{f(W_g/2\rho t_1)}{f\left(\sqrt{1 + (W_g/\sqrt{2}\,s)^2 - (\rho t_1/\sqrt{2}\,s)^2}\right)}\right) +$$

$$\frac{1}{\pi s k_{Sub}} \ln\left(\frac{h((W_g/\pi t_2)^2 - 4(\rho t_1/\pi t_2)^2)}{h((W_g/\sqrt{2}\,s)^2 - 4(\rho t_1/\sqrt{2}\,s)^2)}\right)$$

where, $\rho = 4k_{GaN}/\pi^2 k_{Sub}$ $$f(x) = \frac{\sqrt{x+1} + \sqrt{x-1}}{\sqrt{x+1} - \sqrt{x-1}}$$

-continued $$h(x) = \sqrt{\frac{\sqrt{x+1}+1}{\sqrt{x+1}-1}}$$

The thermal resistance is comprised of a GaN contribution and two substrate contributions. The substrate contribution is comprised of two components: the thermal spreading resistance, and the bulk thermal resistance. As expected, the thermal spreading term is independent of the substrate thickness, $t_2$. The bulk thermal resistance term is substantially inversely proportional to gate pitch s.

Finally, in constructing a model (herein, HEMT model) corresponding to the TRE method 110a-2, which in one embodiment can be applied to GaN HEMT structures, several conditions are preferably observed to ensure the accuracy of the result: the heat source is long and thin (i.e., $W_g \gg L_g$ and $t_2 \gg L_g$, which is typically the case in HEMT structures); there at least two gate fingers on each side of the center gate finger, in order to justify adiabatic boundary conditions; the metal thickness of gate, drain, and source is thin (2 µm or less) so that its heat capacity can be ignored (numerical analysis predicts a slight reduction in thermal resistance if the drain/source metal is thick (more than 2 µm)); the substrate thickness $t_2$ is greater than the gate pitch, $t_2 > s$, which is typically the case.

The submicron gate length dimension makes it very challenging to measure temperature right at the channel. Nonetheless, Kuball et. al. (see M. Kuball, S. Rajasingam, A. Sarua, M. J. Uren, T. Martin, B. T. Hughes, K. P. Hilton, and R. S. Balmer, "Measurement of temperature distribution in multifinger AlGaN/GaN heterostrcture field-effect transistors using micro-Raman spectroscopy," Applied Physics Letters, vol. 82, no. 1, pp. 124-126, 2003) were able to measure channel temperature with high resolution using Raman spectroscopy. This is an attractive high precision (about 1 µm resolution) approach to measuring the channel temperature without perturbing the device. The following device parameters were used: gate-gate spacing (25 µm), gate length (0.8 µm), gate width (250 µm), number of gates (8), substrate thickness (350 µm), thermal conductivity: ($k_{GaN}$ 1.6, $k_{SiC}$ 3.3 W/K cm), total power input, 20V×670 mA, base heating is 20% of peak temperature.

The measured channel temperature was,

Measured $T_j \approx 225°$ C.

The HEMT model corresponding to the TRE method 110a-2 predicts, at room temperature operation, a peak temperature rise, Calculated $T_j = \begin{cases} 227° \text{ C. if } k_{SiC} = 3.3 \text{ W/K cm} \\ 192° \text{ C. if } k_{SiC} = 4.08 \text{ W/K cm} \end{cases}$ As shown, this is close to the measured value.

Moreover, Kuball et. al. measured temperatures at varying input powers for two devices (8×250 µm, and 4×250 µm). The 4-finger case violates an assumption described above, but nonetheless, it is analyzed with the expectation that the HEMT model will over-estimate the temperature. The data is plotted on FIGS. 12 and 13, along with the HEMT TRE model prediction for two cases: $k_{SiC}$=3.3 W/cm K, and $k_{SiC}$=4.08 W/cm K. Plot 1200 is associated with the 4×250 mm device case, and provides a y-axis 1202 corresponding to temperature in degree Celsius and an x-axis 1204 corresponding to power density in W/mm. Line 1206 corresponds to a HEMT model having a $k_{SiC}$ value of 3.30. Line 1208 corresponds to the Kuball simulation values. Line 1210 corresponds to a HEMT model having a $k_{SiC}$ value of 4.08. Symbols (triangles) 1212 correspond to Kuball's measured data. The value of $k_{SiC}$=3.3 corresponding to line 1206 was used in order to be consistent with simulation assumptions of Kuball. The value of $k_{SiC}$=4.08 corresponding to line 1210 was used based on known measurements of $k_{SiC}$ of high purity semi-insulating substrate where $k_{SiC}$ was found to be equal to 4.9 W/cm K along a-axis and 4.08 W/cm K along c-axis (see St. G. Müller, M. F. Brady, W. H. Brixius, G. Fechko, R. C. Glass, D. Henshall, H. McD. Hobgood, J. R. Jenny, R. Leonard, D. Malta, A. Powell, V. F. Tsvetkov, S. Allen, J. Palmour and C. H. Carter, Jr. "High Quality SiC Substrates for Semiconductor Devices From Research to Industrial Production," Materials Science Forum, vols. 389-393, pp. 23-28, 2002 and related research by St. G. Müller of CREE, Inc. who measured $k_{SiC}$ along a-axis and along c-axis and determined that $k_{SiC}$ along c-axis is about 20-30% less than $k_{SiC}$ along a-axis. Thus along c-axis, a value of 4.9/1.2=4.08 W/cm K is expected. The commonly used value of $k_{SiC}$=3.3 W/cm K is based on earlier substrates with lower purity than currently achieved.).

In calculating the channel temperature, room temperature operation was assumed and that the base heats up by 20% of the peak temperature rise, consistent with Kuball. As shown, the HEMT model's predictions (for $k_{SiC}$=3.3 case) 1206 was very close to the simulation results 1208. The HEMT model prediction corresponding to line 1210 (for $k_{SiC}$=4.08 case) was very close to the measured data 1212. The $k_{SiC}$ value of 4.08 is more accurate according to the Muller reference noted above.

Figure 13:
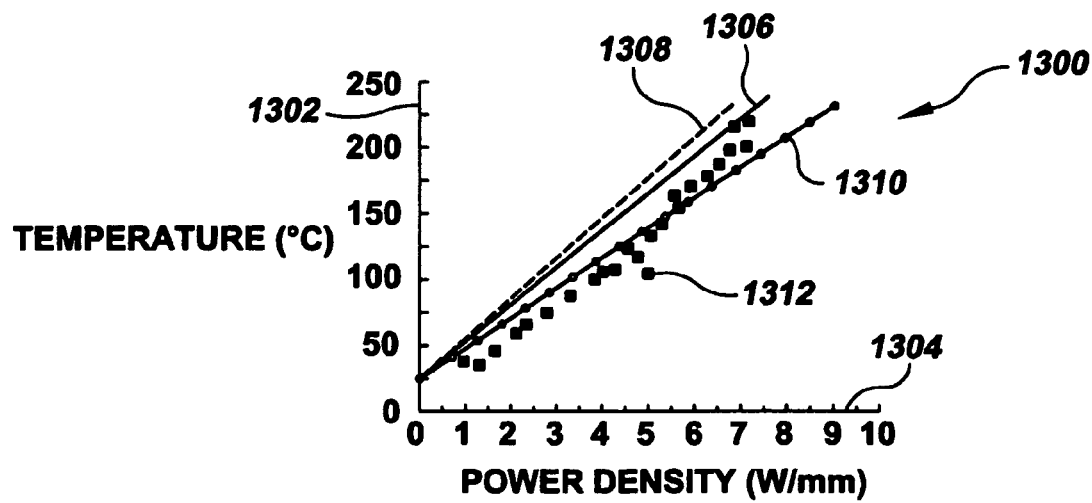
FIG. 13 is a plot that illustrates modeled and measured channel temperatures for a HEMT structure.

FIG. 13 shows a plot 1300 associated with the 8×250 mm device case, and provides a y-axis 1302 corresponding to temperature in degree Celsius and an x-axis 1304 corresponding to power density in W/mm. Line 1306 corresponds to a HEMT model having a $k_{SiC}$ value of 3.30. Line 1308 corresponds to the Kuball simulation values. Line 1310 corresponds to a HEMT model having a $k_{SiC}$ value of 4.08. Symbols (triangles) 1312 corresponds to Kuball's measured data. The value of $k_{SiC}$=3.3 corresponding to line 1306 was used in order to be consistent with simulation assumptions of Kuball. In similar manner to that shown for FIG. 12, close agreement again is shown. As expected, the HEMT model, which assumes a large number (5 or more) of fingers, shows better agreement with the 8-finger device, as reflected by the plot of FIG. 13. Several issues contribute to the difference between theory and experiment. First, the measurement has 10° C. margin of error. Second, there are many uncertainties in the simulation including the proper values of $k_{GaN}$ and $k_{SiC}$. Last, the thermal conductivity is assumed to be constant with temperature. In reality, it is temperature dependent and decreases as a function of temperature. That may be why the measured data curves up in FIG. 13 as the dissipated power increases. This nonlinearity can be accounted for in the model using Kirchhoff's transformation as explained above.

It should be emphasized that the above-described embodiments of the present disclosure, particularly, any "preferred" embodiments, are merely possible examples of implementations, merely set forth for a clear understanding of the principles of the disclosed systems and methods. Many variations and modifications may be made to the above-described embodiment(s) without departing substantially from the principles of the systems and methods. All such modifications and variations are intended to be included herein within the scope of this disclosure.

What is claimed is:

1. A system for estimating channel temperatures of a field effect transistor structure, comprising: logic configured to receive and associate geometrical values corresponding to a field effect transistor (FET) structure in a first region to prolate spheroidal coordinates from which the approximate channel temperature can be computed and to associate heat transfer contours in a second region of the FET structure to elliptical cylinder coordinates, the second region comprising heat transfer contours that propagate in an elliptical cylinder manner.

2. A system for estimating channel temperatures of a field effect transistor structure, comprising:
logic configured to receive geometrical values corresponding to a field effect transistor (FET) structure and to associate the geometrical values of the FET structure to elliptical cylinder and prolate spheroidal coordinates to provide a closed form expression from which the approximate channel temperature can be computed.

3. The system of claim 2, wherein the logic is further configured to associate heat transfer contours in a first region of the FET structure to circular cylinder coordinates, the first region comprising heat transfer contours that propagate in a circular cylinder manner.

4. The system of claim 2, wherein the logic is further configured to associate heat transfer contours in a second region of the FET structure to the prolate spheroidal coordinates, the second region comprising heat transfer contours that propagate in an ellipsoidal manner.

5. The system of claim 2, wherein the logic is further configured to associate heat transfer contours in a third region of the FET structure to the elliptical cylinder coordinates, the third region comprising heat transfer contours that propagate in an elliptical cylinder manner.

6. The system of claim 2, wherein the FET structure comprises a substrate layer and a buffer layer and a heat source, the buffer layer disposed between the substrate layer and the heat source.

7. The system of claim 2, wherein the logic is further configured to use at least one dimension of the FET structure to form prolate spherical coordinates representative of geometrical constructs of heat contours from which an estimate of channel temperature is derived.

8. A system for estimating channel temperatures of a field effect transistor (FET) structure having a substrate layer and a heat source, the system comprising logic configured to receive and associate geometrical values corresponding to a field effect transistor to prolate spherical coordinates, the logic comprising at least one input for inputting at least one dimension of a gate within the FET structure to form prolate spherical coordinates representative of an ellipsoid isothermal contour from which an estimate of channel temperature is derived.

9. A system for estimating channel temperatures of a field effect transistor structure, comprising:
logic configured to receive geometrical values corresponding to a field effect transistor (FET) structure, said logic configured to associate the geometrical values of the FET structure to elliptical cylinder and prolate spheroidal coordinates to provide a closed form expression from which the approximate channel temperature can be computed; and
means for computing the thermal resistance of the field effect transistor structure based upon length and width of the FET structure, comprising means for calculating the thermal resistance $\theta_I$ as the thermal resistance between an inner half plane confocal ellipsoid A representing the heat source and an outer half-plane confocal ellipsoid B, each of the ellipsoids A and B having minor axis $r_{1A}$ representing one half of the length of an FET structure and $r_{1B}$ representing one half of the width of an FET structure, respectively, and major axes $r_{2A}$ and $r_{2B}$ respectively, representing the outer periphery of the projected heat propagation lines, using the equation $$\theta_I = \frac{1}{2\pi R k}(\ln[\tanh(\frac{\varphi_B}{2})] - \ln[\tanh(\frac{\varphi_A}{2})]);$$

where $$\varphi_A = \frac{1}{2}\ln\left(\frac{r_{2A} + r_{1A}}{r_{2A} - r_{1A}}\right) \quad \varphi_B = \frac{1}{2}\ln\left(\frac{r_{2B} + r_{1B}}{r_{2B} - r_{1B}}\right) \quad R = \sqrt{r_{2A}^2 - r_{1A}^2} = \sqrt{r_{2B}^2 - r_{1B}^2}.$$

10. The system of claim 9, wherein the means for computing further comprises means for associating the geometrical values of the FET structure to the elliptical cylinder and prolate spheroidal coordinates and circular cylinder coordinates.

11. The system of claim 10, further comprising means for computing the closed form expression to provide a channel temperature estimate.

12. A computer modeling system for estimating heat transfer contours in order to determine the estimated operating channel temperatures for an FET structure; the FET structure having at least one gate, the system comprising:
means for determining the configuration of a first isothermal contour surrounding at least one gate of the FET structure; the first isothermal contour residing in a first region;
logic configured to receive geometrical values corresponding to a field effect transistor (FET) structure, said logic configured to associate the geometrical values of the FET structure to prolate spheroidal coordinates from which the approximate channel temperature can be computed;
at least one input for inputting the length and width of at least one FET gate;
a processor for approximating the first isothermal contour in the form of at least one geometrical form using prolate spherical coordinates derived from at least one dimension of the at least one gate;
an output for outputting the approximate temperature of the FET channel.

13. The system of claim 12 wherein the geometrical form is an ellipsoid and the at least one dimension comprises the length and width of the gate.

14. The system of claim 12 wherein the system is used for approximating the maximum channel temperatures for an FET structure having multiple unit cells, each unit cell having a gate, with adjacent cells sharing a drain and a source, and wherein the processor approximates the heat transfer contours in a second area in the form of at least one other geometric form using prolate spherical coordinates derived from at least one dimension of the FET structure.

15. The system of claim 14 wherein the at least one other geometric form is an elliptic cylinder and the at least one dimension of the FET structure comprises the distance between the centerlines of the gates of adjacent unit cells.

* * * * *